Aug. 25, 1931.  F. U. CONARD  1,820,440
METHOD OF FORMING TYPE BAR GUIDES
Filed April 4, 1929
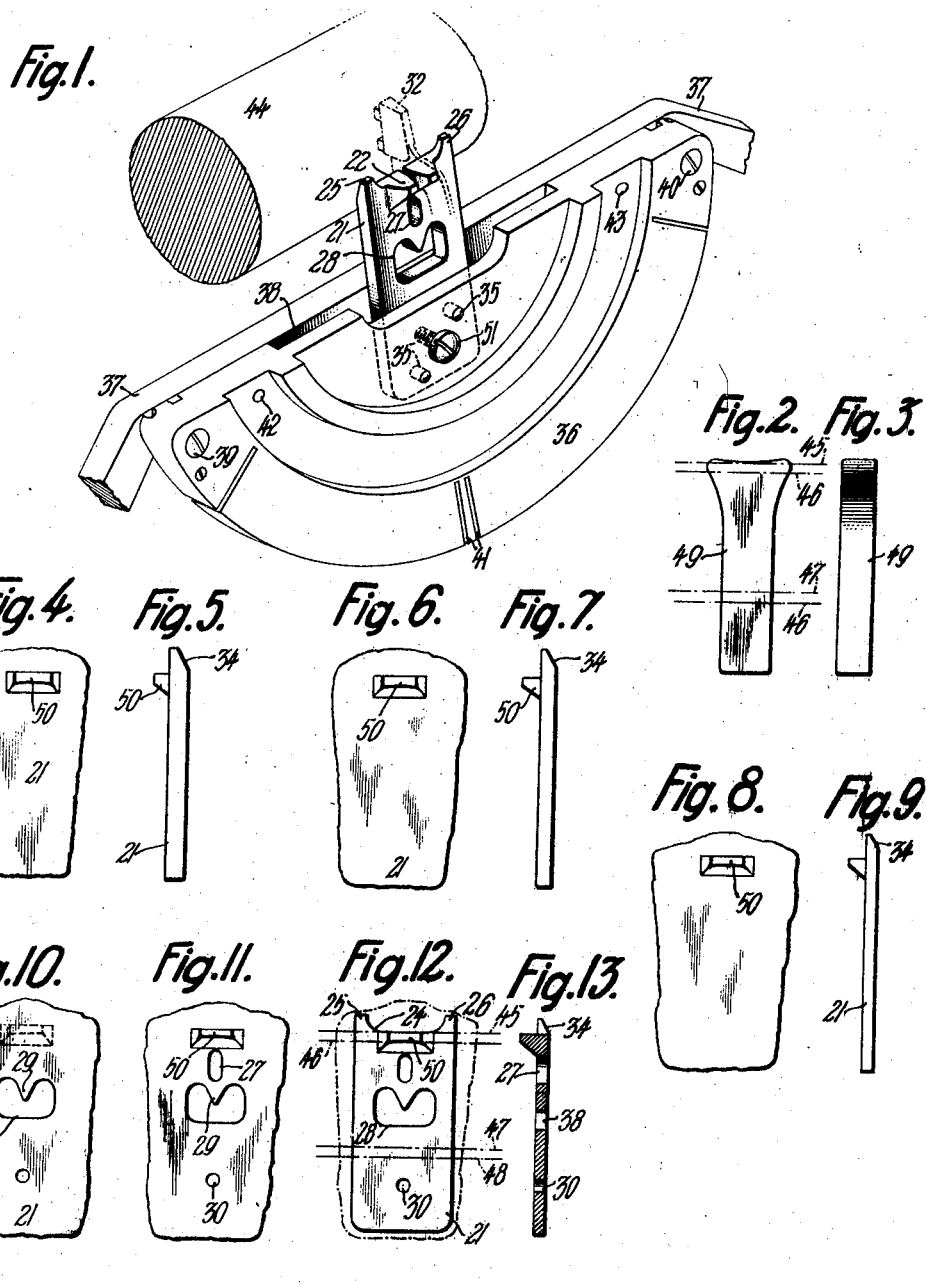
Inventor:
Frederick U. Conard
by B. C. Stickney
Attorney.

Patented Aug. 25, 1931

1,820,440

UNITED STATES PATENT OFFICE

FREDERICK U. CONARD, OF BRIDGEPORT, CONNECTICUT, ASSIGNOR TO UNDERWOOD ELLIOTT FISHER COMPANY, OF NEW YORK, N. Y., A CORPORATION OF DELAWARE

METHOD OF FORMING TYPE-BAR GUIDES

Application filed April 4, 1929. Serial No. 352,418.

This invention relates to type-guides for typewriting machines and the method of making the same, and more specifically to a method of making a novel form of guide that has been specially designed to be easily manufactured and efficient in its operation.

In type-guides for typewriting machines it is necessary to form flared guide-openings for the type-bars to enter before the types reach the platen, so that in the event the bars are slightly sprung out of the exact alignment, the guide will cause them to assume the correct position. In order to provide this flared guide-opening heretofore it has been necessary to use material having a thickness equal to the total length of the guide-opening and then machine down the stock where it was not needed, all at considerable expense in material and labor.

One of the features of this invention relates to the method of making a type-guide with the least amount of material.

Another feature of this invention relates to the advantages of doing away with expensive milling operations and replacing them with very much cheaper punch-press and swedging operations.

Another feature lies in the process used in forming the guides. By cold swedging the steel or other alloy, it is practicable to hold the thickness closer or more accurately than would be the case if the device were formed by forging. Moreover, the necessity for providing a forge is avoided. The necessity is avoided of forming the guide out of material which is covered with scale from previous heating. In some cases the device may be shaped by the cold process, as herein described, from a metal which would not be suited for heat treatment.

Another feature relates to the straight flat form of guide disclosed as distinguished from the usual irregular forms heretofore used, thereby making the guide much easier to manufacture and finish.

Other features and advantages will hereinafter appear.

Referring to the drawings,

Figure 1 is a view of the guide assembled with the parts of the machine with which it is associated.

Figure 2 is a face view of the blank or work-piece as it is punched out of sheet-metal in the first operation.

Figure 3 is an edge view of Figure 2.

Figure 4 is a face view of the work-piece after the first swedging operation.

Figure 5 is an edge view of Figure 4.

Figure 6 is a face view of the work-piece after the second swedging operation.

Figure 7 is an edge view of Figure 6.

Figure 8 is a face view of the work-piece after the third swedging operation.

Figure 9 is an edge view of Figure 8.

Figure 10 is a rear view of the work-piece after certain piercing operations.

Figure 11 is a face view of the work-piece after all of the piercing operations.

Figure 12 is a face view of the work-piece after it has been trimmed to finished contour.

Figure 13 is an edge view of Figure 12.

Figure 14 is an isometric view of the completed guide ready to be assembled.

The guide 21 as shown in Figure 14 is substantially a flat plate, generally rectangular in form and constructed with a pair of jaws 22 and 23 at one end having a flared opening 31 between them, to guide the type-bars 32 into proper typing position with reference to the platen. The opening 31 is a slot which runs into an aperture or cutter-clearing hole 27 located just beyond the jaws 22 and 23. The guide is provided with projecting corners or horns 25 and 26, having fillets 24, at its upper end, and these are chamfered as shown at 34, Figure 14, to form paper-deflecting faces near the surface of the platen. Near the center of the guide 21 is pierced an opening 28, to form a pointer 29, for a scale on the carriage (not shown). Near the lower end of the guide is a pierced and tapped hole 30 which enables the guide to be assembled to the segment 36, in a recess 38 therein, by means of a screw 51. Dowel pins 35, 35 may be employed to retain the guide in alignment.

The segment 36 is assembled in the machine by screws 39 and 40 and dowel pins 42 and 43 securing it to a cross-bar 37, forming part of the frame of the machine. The segment 36 is provided with the usual radial slots 41 to receive the type-bars 32. The upper end of one type-bar 32 is shown in dotted lines in Figure 1, in typing position, at which time the bar 32 has fully entered the guide-opening 31 and the type has been properly located laterally thereby in position on the platen 44.

The novel method of manufacturing the type-bar guide described above will now be considered.

In the series of views from Figure 2 to Figure 13 are shown one sequence of operations needed to produce the finished guide.

In putting this invention into practice the first thing necessary is to determine the shape of the blank and to do this it is necessary to determine the amount of material needed at different places along the length of the blank by dividing it into imaginary parallel zones equally spaced and running transversely of the blank. Two of these zones correspondingly numbered are indicated in Figures 2 and 12. By referring to the zone between lines 45 and 46 it is seen that the maximum amount of material is needed at this place on account of the increased thickness necessary to produce a lug in relief for the jaws 22 and 23, Figure 14. The thickness of the blank may be approximately the same as the greatest thickness of the finished article at any place. Having determined the amount of material needed in each zone, the shape of the blank 49 to produce it is readily arrived at.

One of the novel features of this invention lies in swedging the material so that it flows only in predetermined directions, thereby making it possible to figure out to a nicety the amount of material needed and thereby reduce the waste to a minimum. In the present instance the material is designed to flow almost entirely laterally and to be deliberately restricted from flowing longitudinally excepting insofar as it is necessary to fill out the contour of the piece. Inasmuch as the guide 21 is of the same cross-section throughout most of its length, the blank 49 will likewise be the same, the difference being that inasmuch as the blank must be of the same thickness as the greatest thickness of any portion of the guide, the width of the blank will be correspondingly less.

Having determined the shape of the blank, the first operation is to punch-out the same, as shown in Figures 2 and 3, in an ordinary power punch-press.

The second operation is to die-swedge the blank 49 to the forms in Figures 4 and 5 where a tapering projection or lug 50 is formed by compressing the blank around the lug-position to leave the lug in relief and the blank reduced in thickness, the metal of the sections 47 and 48 spreading sidewise and the sections 45 and 46 spreading sidewise and lengthwise away from the lug 50 to form a beveled face 34. Through the suitable formation of the swedging dies for the subsequent operations the over-all length of the Figure 4 blank will not be appreciably affected, the metal preferably spreading sidewise as the thickness of the blank is reduced. The last swedging operation may be made by a combined finishing and flattening die to leave hard, compressed, parallel surfaces requiring no subsequent surface-finishing before being assembled upon the type-bar segments.

Figures 6 and 7 show a second swedging operation and Figures 8 and 9 show a third and final swedging operation needed to get the stock down to the desired thickness and width. Between the swedging operations the piece may be annealed if required, depending upon the kind of material used.

The holes 28 and 30 may be simultaneously pierced in the swedged blank, as shown in Figure 10, and these two holes become locating holes for locating the blank for the subsequent piercing and machining operations. The hole 27 and the two dowel holes 35—35 may be pierced at the same time at a second piercing operation, if desired, taking a location from the pierced holes 28 and 30. The swedged blank may now be die-trimmed to the form of Figure 12 by removing the superfluous stock and forming the two beveled-off horns 25 and 26. The two holes 28 and 30 may again locate and center the trimmed and pierced blank in a fixture for milling a slot through the lug 50 and into the tool-clearance hole 27, to form the type-bar guiding and type-bar centering opening 31. In this manner the finished guide has become an interchangeable product that can be correctly and quickly located upon any segment 36 by the dowels 35 and secured by the screw 51.

It will, of course, be understood that the guide 21 can be tempered or case-hardened, if desired, to give greater wearing quality to the guide-opening 31; that the type-bar guide is the product of compression and the attendant expansion of metal by a cold process between powerful swedging dies, as distinguished from the hot process under drop-hammer impacts; that the cold swedging is a labor-saving process because of the absence of hard surface scale that requires scale-removing operations; that the cold swedging process gives bright, smooth, hard-finished surfaces that require no subsequent surface-finishing; that the lug 50, the paper-deflecting faces 34 on the spaced-apart horns 25 and 26 and the pointer 29 are all progressive power-press operations; and that the single milling operation for the type-bar slot 31 is the only machine-cutting operation required in the production of the guide.

This invention, while disclosed in connection with making guides for type-bars of typewriting machines, may be generally useful in making many articles of a similar nature and the claims based upon the method of manufacture are therefore not restricted to any particular article or definite part of a machine.

Variations may be resorted to within the scope of the invention, and portions of the improvements may be used without others.

Having thus described my invention, I claim:

1. The method of developing a guide for the type-bars of a typewriting machine, including punching out a metal blank cold die-swedging the blank to expand it laterally and substantially reduce its thickness, simultaneously upsetting a lug upon the expanded face of the blank, trimming the blank to final form, and bifurcating the lug by a milling cut to form jaws that guide and center the type-bars.

2. The method of developing a guide for the type-bars of a typewriting machine, including punching out a metal blank of uniform thickness and of varying widths along its length predetermined by the economical distribution of metal for a finished product, cold swedging the punched-out blank to reduce its thickness, increase its area, form a lug in relief on the swedged blank, and then die-trim the edges of the swedged blank for a finished type-bar guide blank.

3. The method of developing a guide for the type-bars of a typewriting machine, including punching out a metal blank of uniform thickness and of varying widths along its length predetermined by the economical distribution of metal for a finished product, cold swedging the punched-out blank to reduce its thickness, increase its area, form a lug in relief on the blank, bevel the free end of the blank above the lug, and then die-trim the edges of the swedged blank to a final form to provide spaced-apart beveled-off prongs at either side of the lug for paper-deflecting elements.

4. The method of developing a guide for the type-bars of a typewriting machine, including punching out a metal blank of uniform thickness and of varying widths along its length predetermined by the economical distribution of metal for a finished product, cold-swedging the punched-out blank to reduce its thickness, increase its area, form a lug in relief on the swedged blank die-trim the edges of the swedged blank for a finished type-bar guide-blank, and then pierce the trimmed blank with locating holes for subsequent machine-tool operations for an interchangeable product.

5. The method of developing a guide for the type-bars of a typewriting machine, including punching out a metal blank of uniform thickness and of varying widths along its length predetermined by the economical distribution of metal for a finished product, cold-swedging the punched-out blank to reduce its thickness, increase its area, form a lug in relief on the swedged blank, die-trim the edges of the swedged blank for a finished type-bar guide-blank, and pierce the trimmed blank with locating holes, said locating holes aligning the blank for a mill-slotting cut through the lug to form jaws that guide and center the type-bars.

6. The method of developing a guide for the type-bars of a typewriting machine, including punching out a blank from sheet-metal for a uniform thickness and varying widths along its length according to the economical distribution of metal for an irregular product, reducing the thickness of the blank to a thin flat plate of definite pattern with a lug in relief thereon, by a series of separate cold swedging operations, and then die-trimming the edges of the plate relative to the location of the lug.

7. The method of developing a guide for the type-bars of a typewriting machine, including punching out a blank from sheet-metal for a uniform thickness and varying widths along its length according to the economical distribution of metal for an irregular product, reducing the thickness of the blank to a thin flat plate of definite pattern with a lug in relief thereon, by a series of separate cold swedging operations, die-trimming the edges of the plate relative to the location of the lug, and then piercing the plate under the lug to form a scale-pointer.

FREDERICK U. CONARD.